Figure 1:
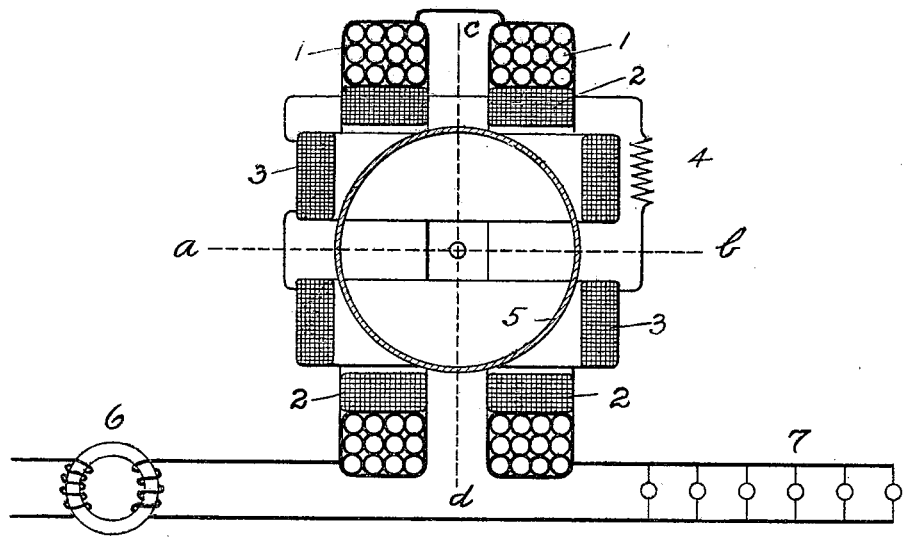

No. 623,522. Patented Apr. 25, 1899.
T. DUNCAN.
ELECTRIC METER.
(Application filed Mar. 12, 1898.)
(No Model.) 4 Sheets—Sheet 1.

Witnesses
Samuel R. Bachtel
Edward F. Tierney

Thomas Duncan Inventor
By his Attorneys Chapin & Denny

No. 623,522. Patented Apr. 25, 1899.
T. DUNCAN.
ELECTRIC METER.
(Application filed Mar. 12, 1898.)
(No Model.) 4 Sheets—Sheet 2.

Witnesses
Samuel R. Bachtel
Edward F. Tierney

Thomas Duncan Inventor
By his Attorneys Chapin & Denny

No. 623,522. Patented Apr. 25, 1899.
T. DUNCAN.
ELECTRIC METER.
(Application filed Mar. 12, 1898.)

(No Model.) 4 Sheets—Sheet 3.

Witnesses
Samuel R. Bachtel
Edward F. Tierney

Thomas Duncan Inventor
By his Attorneys Chapin & Denny

No. 623,522. Patented Apr. 25, 1899.
T. DUNCAN.
ELECTRIC METER.
(Application filed Mar. 12, 1898.)
(No Model.) 4 Sheets—Sheet 4.

Witnesses
Samuel R. Bachtel
Edward F. Tierney

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 623,522, dated April 25, 1899.

Application filed March 12, 1898. Serial No. 673,550. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric meters, and especially to that class known as "coulomb" or "ampere" hour meters.

My invention comprises a method of and means for producing two magnetic fields or axes at right angles to each other and differing in phase by the employment of three adjacent coils or windings—to wit, a primary coil conveying the main current and producing one axis of magnetization, a secondary coil having a coaxial arrangement with the said primary coil and adapted to receive current from it by induction, and a third coil or winding arranged at right angles to said primary and secondary coils and connected in series with the said secondary coil, thereby producing a second axis of magnetization at right angles to the said primary coil.

The object of my invention is to provide an electric meter of simple and economical construction possessing accuracy throughout its entire range and having its actuating-fields adapted to operate at right angles to each other for the purpose of eliminating the detrimental effects of one upon the other by mutual induction.

Similar reference letters and numerals indicate like parts in the drawings.

Figure 2:
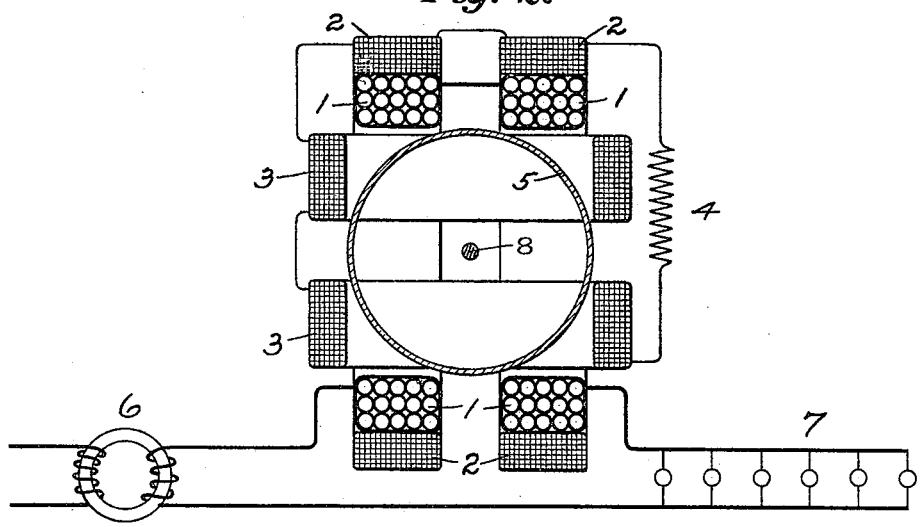
Figure 3:
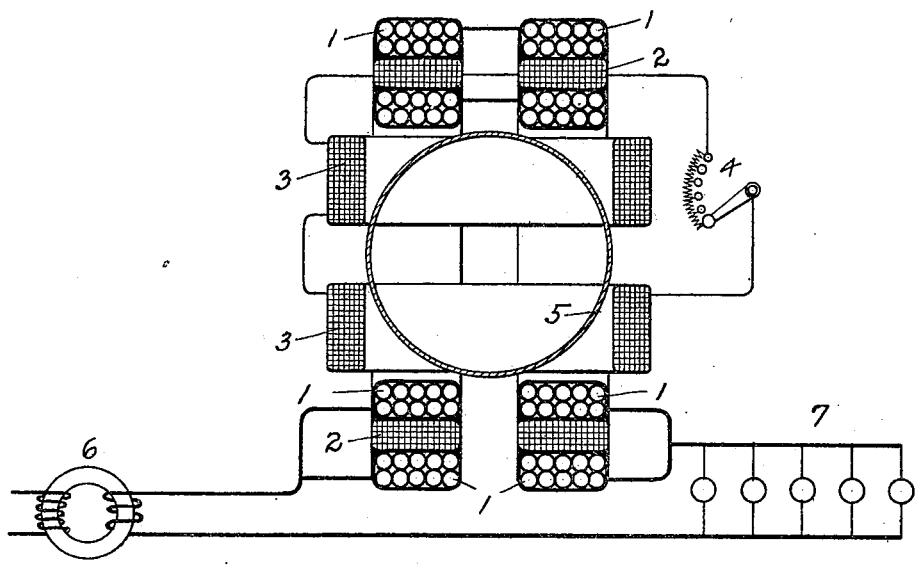
Figure 4:
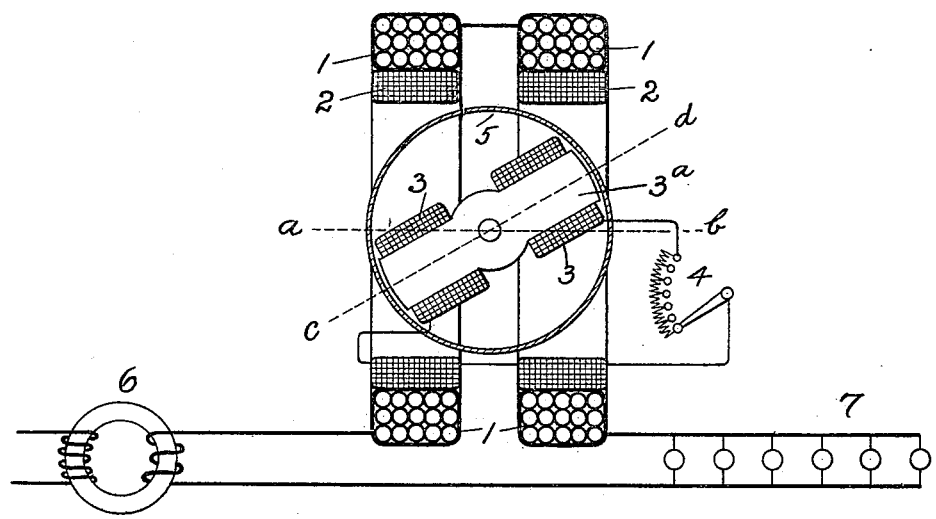
Figure 5:
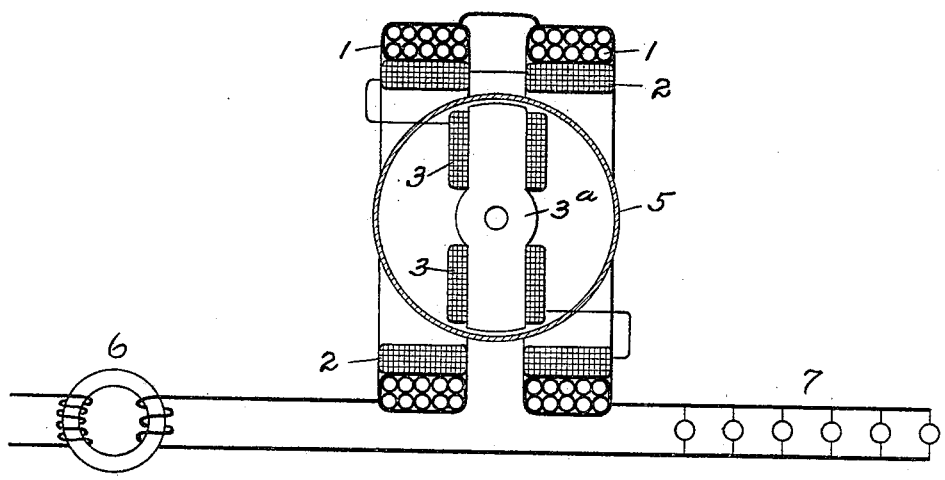
Figure 6:
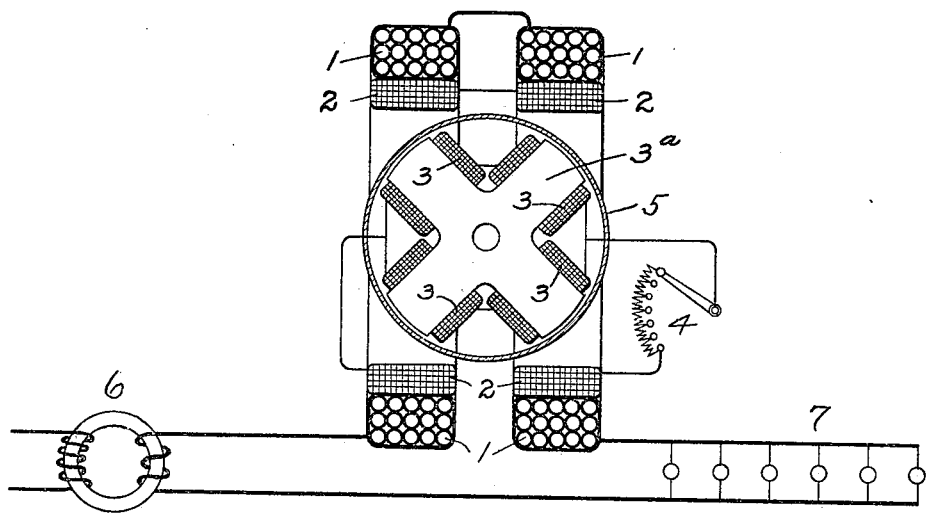
Figure 7:
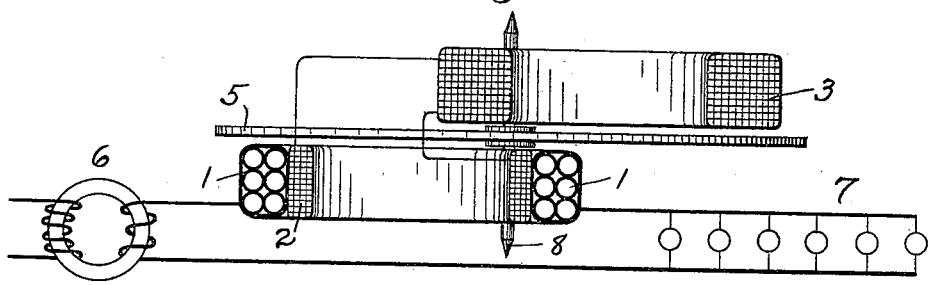
Figure 8:
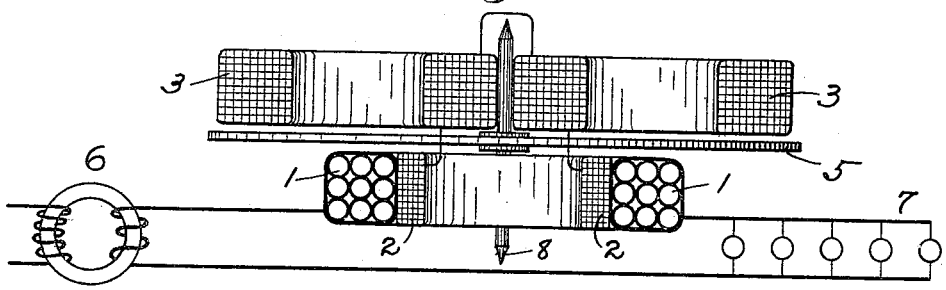
Figure 9:
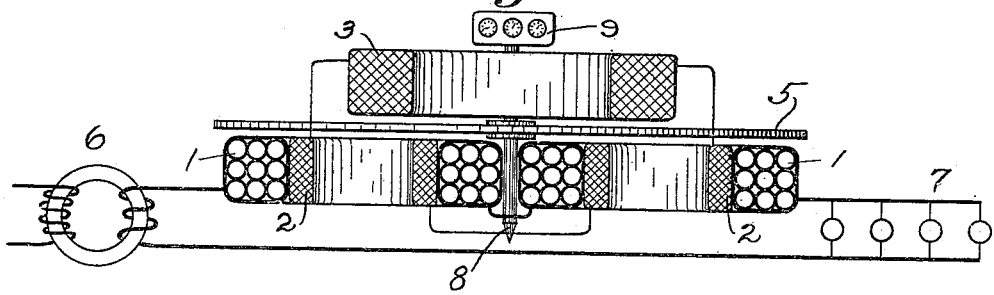

Figure 1 is a horizontal central section of the actuating-coils and cylindrical armature, showing the connection of said coils with a proper transformer and with the lamp-circuit. Fig. 2 is a similar view of my improvement, excepting that in this view the series or field coils form the inner winding. Fig. 3 is a like view showing the secondary coil sandwiched between the series or primary coils. Fig. 4 is also a transverse section of my invention, showing the secondary field-coil arranged within the cylindrical armature at an angle of less than ninety degrees to said field-coils. Fig. 5 is a like view showing the secondary field-coil within the cylindrical armature arranged at right angles to said field-coils. Fig. 6 is a like view to Fig. 5, showing the secondary field-coil wound upon a multipolar laminated iron core $3^a$. Fig. 7 is another form of my invention, showing the energizing-coils in vertical section arranged upon both sides of a disk armature. Fig. 8 is a similar view to Fig. 7, showing a pair of secondary field-coils adjacent to the upper face of the armature, adapted to be energized by the secondary coil adjacent to the lower face of the armature, the said secondary coil receiving its currents by induction from the series or primary coils. Fig. 9 is a similar view to that shown in Fig. 8, showing a pair of series coils adapted to energize the respective inclosed secondary coils, which are connected in series with themselves and with the secondary field-coil adjacent to the opposite face of the disk armature.

The operative elements of my improvement are a closed metallic revoluble armature 5, which may be either in the form of a cylinder, as shown in Figs. 1, 2, 3, 4, 5, and 6, or of a disk, as shown in Figs. 7, 8, and 9, is preferably made of aluminium, and is rigidly fixed upon a proper upright spindle 8, having a proper support and bearing (not shown) and adapted to form an operative connection with a proper registering-train 9 in the usual well-understood manner, a primary coil or coils 1 carrying the main current and arranged in inductive relation to said armature, a secondary coil or coils 2 in concentric or coaxial arrangement with said primary coils 1, respectively, and adapted to energize the secondary field-coils 3, which are also arranged in inductive relation to said revoluble armature 5, and a suitable resistance 4 in series with the said secondary coils 2 and the secondary field-coils 3, adapted to vary the speed of said armature in a well-understood manner. The said coils 1, 2, and 3 are firmly secured and supported in their relative position in any proper manner.

The arrangement of the energizing-coils relative to the revoluble armature and to each other may be variously modified without departing from the spirit and scope of my invention as illustrated in the drawings.

The primary coil or coils 1 may be wound or arranged upon the outer face of the coaxial secondary coils 2, as shown in Figs. 1, 4, 5, 6, 7, 8, and 9, or this arrangement may be reversed and the secondary coil or coils wound upon the outer face of the said primary coils, as shown in Fig. 2, or the said secondary coil 2 may be sandwiched between two of said primary coils, as shown in Fig. 3. This latter arrangement insures efficiency by causing the lines of force from the primary coils 1 to cut through or thread the intermediate secondary coil 2.

The secondary field-coils 3 may be arranged within and at right angles to the said coaxial primary and secondary coils 1 and 2, as shown in Figs. 1, 2, and 3, and embracing said armature, or they may be wound upon an iron core $3^a$ and arranged within the cylindrical armature, and thus varying the speed or torque of said armature by altering the angle of the said coil or coils 3 with the axis of said coils 1 and 2, as shown in Figs. 4 and 5, in the former of which the said coils 3 are arranged at a less angle than ninety degrees with said axis and in the latter figure the coils 3 are arranged at right angles to said axis. This coil 3 may also be given a multipolar construction with good results, as shown in Fig. 6. When the disk form of revoluble armature is employed, as shown in Figs. 7, 8, and 9, the said coil or coils 3 are arranged adjacent to and in inductive relation with the opposite faces of said armature. In Fig. 9 is shown a proper registering-train 9 in coöperative relation with and adapted to be actuated by the revoluble spindle 8. The speed of the revoluble armature may be regulated by means of the said variable resistance 4, which regulates the current flowing through said coil 3, Figs. 1, 2, 3, 4, and 6.

The operation of my invention thus described is briefly as follows: When an impulse of current from the generator 6 traverses the said series coils 1 to supply the lamps 7 in the work-circuit, an axis of magnetization is set up or established thereby at right angles to said series coils and which cuts through the cylindrical armature diametrically, as shown diagrammatically in Fig. 1 by the line $a\ b$. This impulse of current also induces or develops a lagging secondary current in the said secondary coils 2, which energizes the said secondary field-coils 3 in series with the said coils 2 and are arranged, as described, at right angles to said coils 1 and 2. This secondary current in the said coils 3 sets up or establishes a second axis of magnetization (shown diagrammatically at $c\ d$ in Fig. 1,) at right angles to the said axis $a\ b$, and which also cuts through the cylindrical armature diametrically and lags behind the said axis $a\ b$. The combination of these two axes thus forms a resultant magnetic field about said revoluble armature adapted to actuate the same in a well-understood manner.

The primary and secondary field-coils may be arranged adjacent to the opposite faces of a disk armature, as shown in Figs. 7, 8, and 9, in which case the axes of said coils are parallel, but eccentric to each other. In this form of my improvement it is obvious that the axis of magnetization established by the primary will alternately approach and recede from the axis of magnetization set up by the secondary series coil or coils in a well-understood manner, thereby forming a shifting resultant field adapted to actuate the disk armature.

Having thus described my invention and the manner of employing the same, what I desire to secure by Letters Patent is—

1. The combination of a cylindrical revoluble armature; a series coil or coils in inductive relation therewith; a secondary coil or coils in coaxial relation with said series coils, and energized therefrom by induction; a third coil or coils wound upon an iron core and arranged within said armature, and energized by conduction from the said secondary, the said energizing-coils being adapted to establish a shifting magnetic field about said armature to actuate the same.

2. A revoluble cylindrical armature; a series coil or coils in inductive relation to said armature; a secondary coil or coils wound coaxially with said series coils and receiving currents therefrom by conduction; a secondary field-coil wound as shown upon a multipolar iron core and arranged within said armature, and energizing by conduction from the said secondary, whereby a shifting magnetic field is established about said armature to actuate the same; and a variable resistance in series with said secondary coil or coils.

3. The combination in an induction motor-meter of series coils, a coil 2 wound with finer wire than the said series coils and in coaxial and coöperative relation therewith; a revoluble aluminium armature in inductive relation to the said series coils and the said coil 2; a field-coil 3 in inductive relation to the said revoluble armature and receiving its current by conduction from the said coil 2; and means for varying the current in both of the said coils 2 and 3 as described.

4. The combination in an induction motor-meter of a revoluble armature; a series coil or coils connected in series in the main line of supply and in inductive relation to the said armature; a secondary coil or coils 2 receiving current from the series coil or coils by induction, the said secondary coil or coils 2 being wound with smaller wire than the said series coil or coils and mutual inductive relation therewith; a second field coil or coils 3 receiving currents by conduction from the said coil or coils 2; and a variable resistance in series with the said coils 2 and 3 for the purpose described.

Signed by me, at Fort Wayne, Indiana, this 7th day of March, 1898.

THOMAS DUNCAN.

Witnesses:
HOMER VERMONT CARPENTER,
CHARLES JONES.